United States Patent [19]
Cunningham

[11] 3,885,176
[45] May 20, 1975

[54] DYNAMOELECTRIC MACHINE WITH IMPROVED BEARING LUBRICATION SYSTEM

[75] Inventor: Eldon R. Cunningham, Fort Wayne, Ind.

[73] Assignee: General Electric Company, Fort Wayne, Ind.

[22] Filed: Sept. 25, 1972

[21] Appl. No.: 292,175

[52] U.S. Cl. .............. 310/88; 308/36.1; 308/125; 308/132; 310/90
[51] Int. Cl. ...... H02k 5/10; H02k 5/16; F16c 1/24; F16c 13/02
[58] Field of Search ................................ 310/88–90; 308/125, 132, 134, 36.1, 36.3

[56] References Cited
UNITED STATES PATENTS

| | | | |
|---|---|---|---|
| 1,182,092 | 5/1916 | Kirby | 308/132 X |
| 2,323,146 | 6/1943 | Manney | 310/88 |
| 2,402,565 | 6/1946 | Madsen | 308/125 |
| 2,568,056 | 9/1951 | Corder | 308/36.1 X |
| 2,695,822 | 11/1954 | Harkenrider | 308/132 |
| 2,739,020 | 3/1956 | Howes | 308/132 |
| 2,979,779 | 4/1961 | Staak | 18/59 |
| 3,086,825 | 4/1963 | Hilden et al. | 308/36.1 |
| 3,141,708 | 7/1964 | Evangelista | 308/36.1 |
| 3,164,422 | 1/1965 | Shaffer et al. | 308/132 |
| 3,184,272 | 5/1965 | Ridgway | 308/132 |
| 3,235,317 | 2/1966 | Cunningham | 308/132 |
| 3,434,765 | 3/1969 | Abel | 308/132 |
| 3,529,874 | 9/1970 | Hoddy | 310/90 X |

FOREIGN PATENTS OR APPLICATIONS

| | | | |
|---|---|---|---|
| 874,092 | 8/1961 | United Kingdom | 308/132 |

Primary Examiner—J. D. Miller
Assistant Examiner—Robert J. Hickey
Attorney, Agent, or Firm—Ralph E. Krisher, Jr.

[57] ABSTRACT

Bearing system includes felt lubricant storage material or extrudable lubricating material with a felt feed wick arranged to transfer lubricant from the reservoir to at least one bearing journal. Feed wick is constructed to transfer lubricant from the lubricant storage material to the body of the feed member and so that the extrudable lubricant retaining material is in contact with cut fibers or cross-grained surfaces of the feed wick. The feed wick is devised to avoid excessive contact pressures and corresponding feed surface deterioration. A thrust and bearing feeding portion of the feed wick makes predominantly radial (as opposed to predominantly axial) contact with selected portions of a thrust member so as to substantially reduce if not eliminate undesirable compression and densification of such feeding portion. Also disclosed is structure that prevents or retards movement of contaminants into the system. In an illustrated form, such structure includes a rubbing seal cooperating with a raised portion of a lubricant reservoir defining end cap. Grease is provided between the seal and end cap so as to maintain lubricant along the rubbing interface of the parts. The raised portion of the end cap also contributes to prevention of contamination of the lubrication system. This portion also contributes to the retention of lubricant for the rubbing interface. Improved oil returning means are also provided that establish relationships with lubricant reservoir covers such that lubricant loss is reduced.

12 Claims, 4 Drawing Figures

3,885,176

DYNAMOELECTRIC MACHINE WITH IMPROVED BEARING LUBRICATION SYSTEM

BACKGROUND OF THE INVENTION

This invention relates generally to dynamoelectric machines and, more particularly, to machines having lubricant feeding and retention systems.

Over the years, much effort has been expended in the dynamoelectric machine, e.g., motor, art toward improving the life of a bearing system so that failure of the bearing system will not cause premature failure of the motor in which the bearing system is used.

Some of the better understood reasons for premature bearing failure in devices such as fractional horsepower motors have been identified as being associated with an inability to feed lubricant, such as oil, to bearing journal surfaces at a sufficiently rapid rate for various given operating conditions. Insufficient lubricant flow rates can result in overheating of the bearings and subsequent bearing failure. On the other hand, adequate lubricant feed rates tend to keep friction at a minimum and thus tend to minimize the amount of heat generated along relatively moving bearing surfaces. Moreover, an adequate flow of lubricant along bearing surfaces can provide a means for preventing overheating of such surfaces.

Adequate lubricant flow rates depend on, among other things, an adequate supply of lubricant in a lubricant reservoir or sump. It will thus be understood that loss of lubricant from a bearing system will, eventually, result in inadequate lubricant flow.

Another factor that must be considered is lubricant contaminants, such as dirt, dust, water, or other water or air-borne contaminants. The presence of water in a bearing lubricant may reduce a lubricant's effectiveness and can also lead to oxidation of bearing surfaces. Dust or other abrasive particles may accelerate wear of bearing surfaces. These contaminants also can reduce lubricant flow rates through fibrous lubricant feeding members in the bearing system.

In the particular case of bearing systems wherein fibrous, e.g., wool felt wick members are utilized to maintain a flow of lubricant to one or more bearing surfaces, glazing or hardening of the surfaces of such feed members or undue compression and compaction of such members can also result in reduced lubricant flow rates. Moreover, when extrudable lubricant retaining material is used in conjunction with a felt feed wick, difficulty may be encountered in establishing a satisfactory lubricant transfer rate from such extrudable material to the felt feed wick.

It thus will be understood that it would be desirable to provide improved bearing systems for rotating machinery wherein lubricant loss preventing arrangements are provided to maximize lubricant retention and minimize lubricant contamination; and wherein desired lubricant flow rates to a bearing may be easily established and maintained.

SUMMARY OF THE INVENTION

It is therefore an object of the present invention to provide improved lubricant loss preventing arrangements for bearing systems of dynamoelectric machines.

It is a more specific object to provide a bearing lubricant sealing arrangement that may be of particular utility for vertical shaft operation of such dynamoelectric machines.

Another object is to provide new and improved lubricant feeding members in a dynamoelectric machine that would contribute to a desirable lubricant transfer rate from an extrudable lubricant retaining material to such feeding members.

Still another object is to provide motors with improved lubricant feeding members so as to reduce or eliminate glazing, hardening, or other undesirable surface conditions that inhibit lubricant flow to the bearings of such motors.

It is yet another object to provide improved bearing system arrangements so as to reduce if not eliminate lubricant loss at low speed or stand still conditions, and particularly for vertical shaft applications.

Another specific object is to provide a new and improved configuration of a lubricant feeding member that provides a flow of lubricant to thrust bearing surfaces in a dynamoelectric machine.

Still another specific object of the present invention is to provide lubricant feeding members for rotating dynamoelectric machines that contribute to low contact pressures or forces on such members so as to reduce deterioration of the surfaces of such members.

In carrying out the above and other objects, I provide an improved bearing system that includes numerous improvements, any one of which may be utilized alone, or, all of which may be utilized in combination to provide improved bearing lubrication systems.

In one illustrated form, a bearing lubrication system is illustrated wherein an extrudable lubricating material or conventional oil retaining felt material is retained in a lubricant reservoir, with a feed wick arranged to transfer lubricant from the reservoir to at least one bearing journal. The feed wick or member is constructed so that transfer of lubricant from the lubricant storage material to the body of the feed member is enhanced. For example, the feeding member may be constructed so that the lubricant retaining material is in contact with cut fibers or cross-grained surfaces of the feeding member. Moreover, the feeding member is devised to avoid excessive pressures and corresponding feed surface deterioration.

A thrust bearing feeding portion of the feeding member may also be provided that makes predominantly radial (as opposed to predominantly axial) contact with selected portions of a thrust member so as to substantially reduce if not eliminate undesirable compression and densification of such feeding portion.

The exemplified system includes means for preventing or retarding the movement of contaminants into the system. In an illustrated form, such means includes a rubbing seal cooperating with a raised portion of a lubricant reservoir defining end cap. A source of lubricant is provided between the seal and end cap so as to maintain lubricant along the rubbing interface of the parts. The raised portion of the end cap also contributes to prevention of contamination of the lubrication system. This portion also contributes to the retention of lubricant for the rubbing interface. Improved oil returning means are also provided that establish relationships with lubricant reservoir covers such that lubricant loss is reduced.

The subject matter which I regard as my invention is set forth in the claims appended to and forming a part of this specification. The invention itself, however, together with further objects and advantages thereof may be better understood by referring to the following more detailed description taken in conjunction with the accompanying drawings.

DESCRIPTION OF THE PREFERRED EMBODIMENTS

Figure 1:
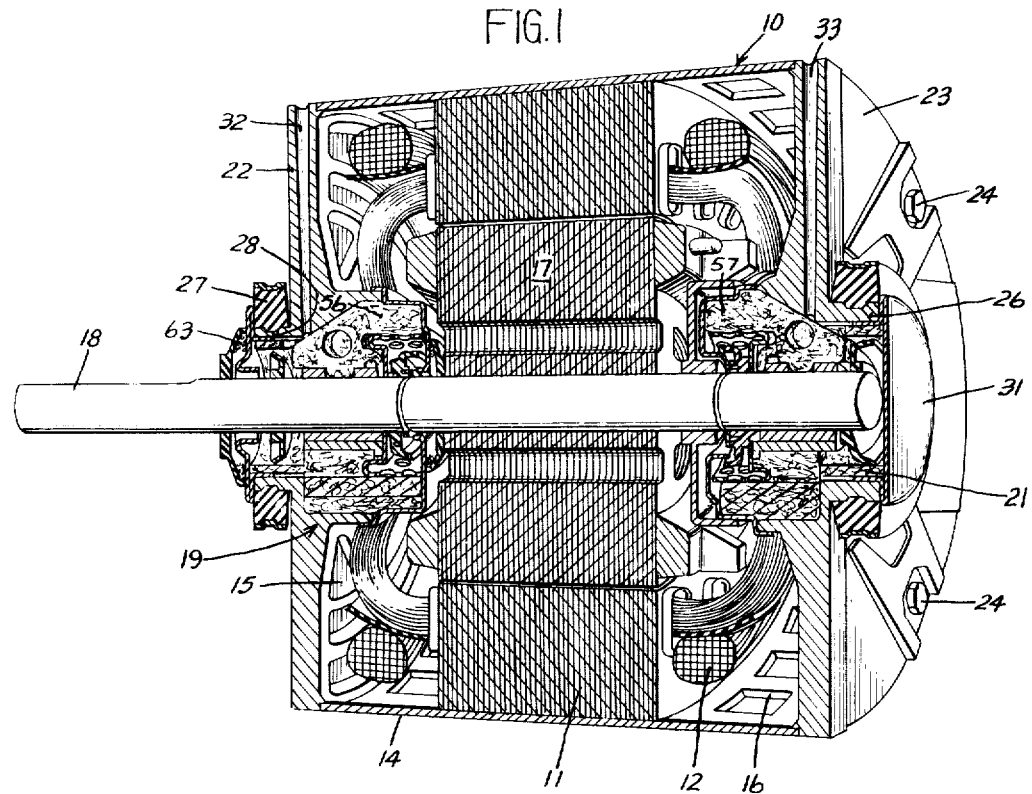
FIG. 1 is a perspective type view, with parts broken away, parts removed, and parts in section, of a fractional horsepower motor embodying the invention in one form.

Turning now to FIG. 1, I have there shown a motor generally denoted by the reference numeral 10. As is conventional, the motor includes a stator, rotor, at least one bearing system, and means for supporting all of these members in predetermined relationships.

In the case of the motor 10 specifically illustrated, there is included a stator core 11 formed from a stack of magnetizable laminations. These may be formed by stamping from a strip of low carbon iron alloy, for example, from steels generally known in the industry as "mild" or magnetic steels. Supported along winding accommodating regions of the stator core 11 are a plurality of turns of windings 12 that may be formed from suitable electrical conductors such as copper or aluminum.

The core of the stator assembly is surrounded by a shell or housing 14 that may, when desired, be provided with openings 16 to promote the movement of air out of openings 15 and thus cool the windings, stator core, and rotor 17 formed of magnetizable laminations like the stator core. As will be understood, the rotor shown in FIG. 1 is of the short circuited squirrel cage type and conductors are disposed in slots along the rotor core. The rotor core, conductors, and shaft 18 together form the rotor assembly for motor 10. Shaft 18 is journalled in a pair of sleeve bearing systems generally denoted by the reference numerals 19 and 21, although for some applications, the motor could have different bearings at each end thereof or could be of the unit or single bearing type.

The bearing system 19, 21 are supported by end frames or end shields 22, 23 and these are secured to the stator of motor 10 by a press fit, through bolts 24, or by any other suitable technique. The end shields 22, 23 include mounting hubs 26 and resilient vibration damping mounting members of known construction suitable for the intended application of the motor are secured to each of these hubs.

The bearing systems 19, 21 are generally similar, one to the other, it being noted that part of the sealing structure provided for the bearing system 19 is not needed in the case of bearing system 21 since the end of the lubricant reservoir at the opposite pulley end of the motor is closed by a pressed in place end cap 31. The bearing system 19 will be described in specific detail herein but it will be understood that bearing system 21 is substantially identical thereto. Accordingly, like reference numerals are used to denote like structural members for the two bearing systems.

Figure 2:
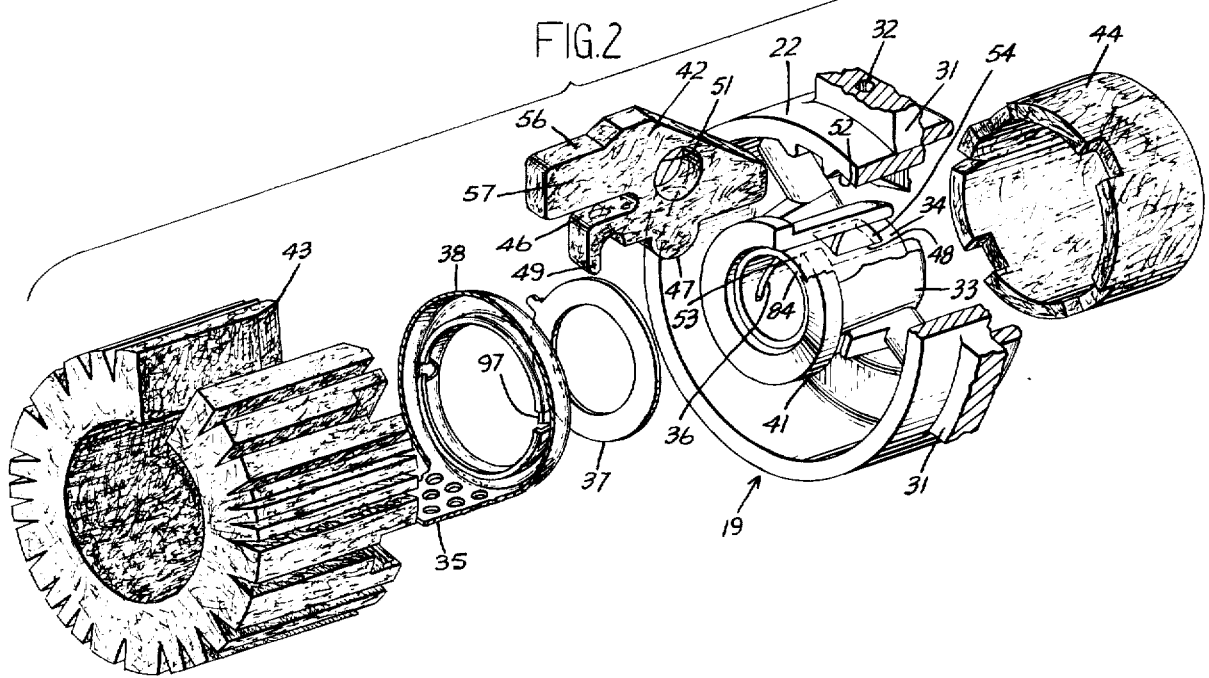
FIG. 2 is an exploded perspective view of parts of a bearing system at one end of the motor shown in FIG. 1.

A substantial portion of the bearing system 19 is illustrated in FIG. 2, it being noted that some members, such as an inboard combination thrust runner and oil thrower, and outboard oil thrower have been omitted for clarity. These omitted members are, however, shown in clear detail in FIG. 3. The arrangement of parts in FIG. 2 have oriented to show them in a different perspective from FIG. 1. This orientation also highlights the similarity of the bearing systems 19 and 21.

The end frame 22 has been shown with parts broken away but parts of ribs 31 are clearly shown. The uppermost rib 31 in FIG. 2 has formed therealong a passage for the admission of oil which may be periodically resupplied to the lubricant reservoir of the bearing system 19. A similar passage 33 is provided in end frame 23.

With continued reference to FIG. 2, the hub 33 of the end frame 22 carries a sleeve bearing 34 therein of any suitable construction and material such as, for example, tin babbitt. The bearing 34 has a window or opening 48 formed therein through which lubricant may pass so as to lubricate the bearing surface of bearing 34 and the journal of the shaft 18 when it is received therein. This type of an arrangement is known and is shown for example in Ridgway U.S. Pat. No. 3,184,272, dated May 18, 1965. The bearing 34 is also provided with at least one lubricant circulation groove 36.

The bearing system 19 also includes a thrust receiving member 37 and retainer 38 which are assembled together as shown both in FIGS. 1 and 2. These members are, in general, more thoroughly described and claimed in copending M. Davich application, Ser. No. 135,581, filed Apr. 20, 1971, which issued as U.S. Pat. No. 3,727,996 on Apr. 17, 1973, and which is assigned to the assignee of this application. In the system 19, the retainer 38 is pressed onto the flange 41 of hub 33 and a thrust runner (see FIG. 3) is disposed to engage and deflect the thrust receiving member 37. Retainer 38 has an extended perforated wall or flange 35 (shown with parts removed) for retaining felt fibers or extrudable material away from slinger 72. The bearing system 19 of FIG. 2 comprises a felt feed wick 42 and lubricant retaining masses of felt 43 and 44. The feed wick 42 is contoured as shown at 46 to avoid interfering with the retainer 38 after assembly of the bearing system. The feed wick 42 includes a feedingtab 47 which is receivable in the window 48 of the bearing 34, and a secondary feeding tab 49 that supplies lubricant to the thrust runner in a predominantly radial direction as will be described in more detail hereinafter. When the members shown in FIG. 2 are assembled together and lubricant is present in the lubricant retaining felt members 43, 44, lubricant will be supplied to the feed wick 42. This wick in turn supplies lubricant through tabs 47, 49 to the desired bearing surfaces.

It will be noted that the wick 42 has a hole or opening 51 formed therein. Multiple advantages result from providing this opening. For example, as the feed wick 42 is assembled with the end frame 22, the felt wick is compressed between the interior wall 52 of the end frame and the exterior surface 53 of the bearing 34. During a manual assembly operation, axial movement of the feed wick into assembled relation with the end frame and bearing will result in a sensation of increasing resistance to axial movement of the feed wick. However, as the feed wick approaches its desired assembled position relative to the bearing and end frame, the tab 47 will pop into the window 48 of the bearing and the resistance to axial movement will suddenly decrease and then increase. This provides a ready indication to the assembler that the wick has been moved into its desired final position. In addition, the hole 51 or an equivalent cut-out permits the feed wick to be easily compressed when the shaft 18 is subsequently assembled within the bearing 34. This ease of compression would result in a reduced opportunity for the shaft to pinch or shear a portion of the projection 47 during such assembly. Moreover, by providing a cut-out, the felt feed wick is relatively easily deflected from the shaft 18 so as to reduce the compressive force between the shaft and the shaft contacting surface tab 47. With this arrangement there is still sufficient contact between the feed wick and the shaft to insure good lubricant transfer to the bearing and shaft. However, the reduced contact pressure reduces the tendency for the surface of the feed wick in contact with the shaft to become glazed or hardened and cause a reduction in lubricant flow to the shaft.

In other words, the hole 51 reduces the mechanical stiffness of the contact of the sleeve bearing feed wick 42 so that when the shaft 18 enters the bearing 34 and pushes the tab or projection 47 upward as viewed in the drawings; the resulting contact pressure between the feed wick and shaft will be lower than would be the case if the felt wick were a solid section and the hole 51 was not provided. It is believed that with the provision of the hole 51, the resulting contact pressure can be made much lower, e.g., less than 50 percent of that for a wick without a hole. This in turn permits and promotes low pressure contact conditions that reduce glazing and "sealing" of the feeding or shaft contacting surface of the wick and, accordingly, also promotes longer life of the bearing system 19.

Figure 3:
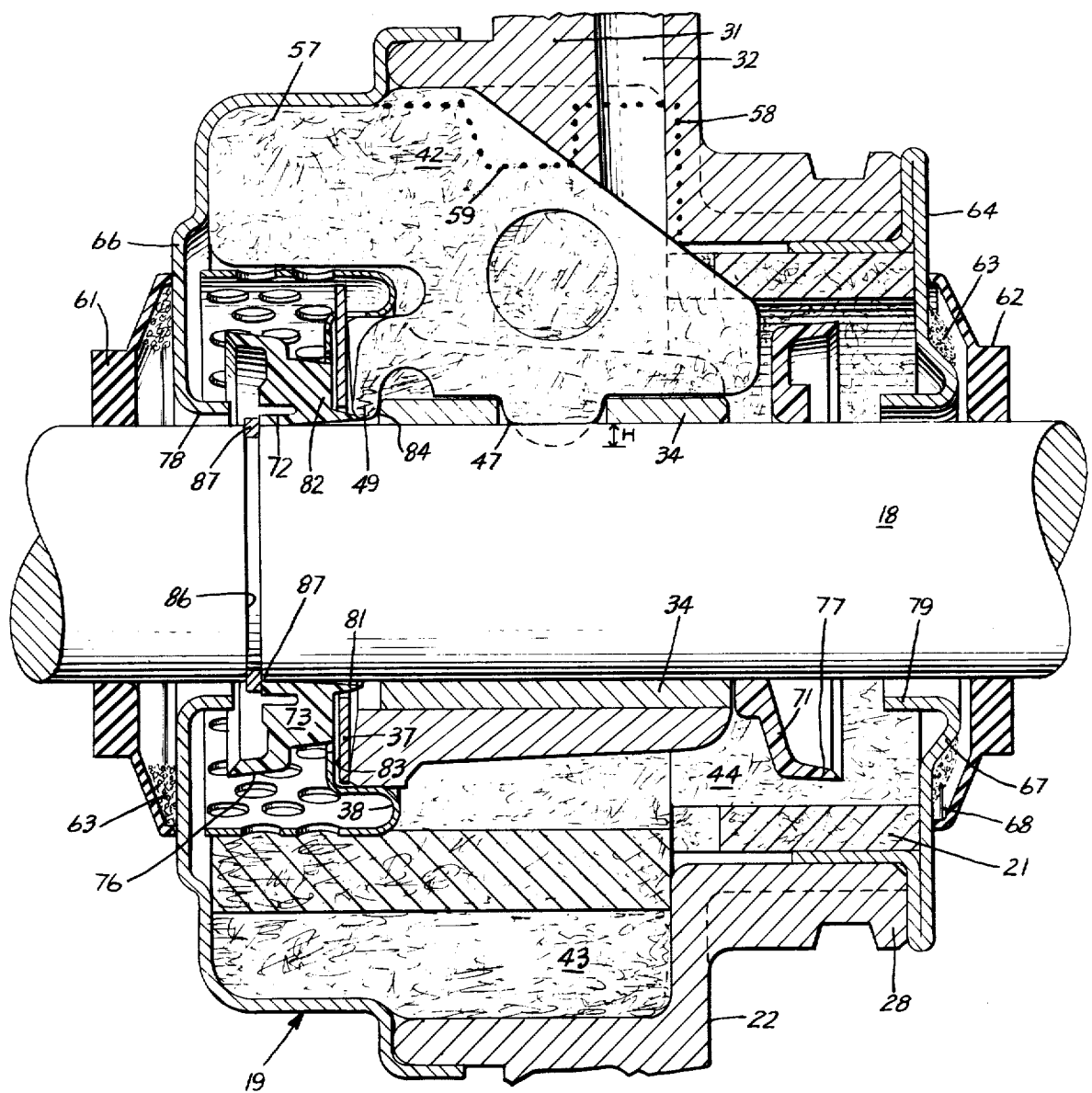
FIG. 3 is an enlarged cross-sectional view taken through the pulley end bearing system of the motor shown in FIG. 1.
Figure 4:
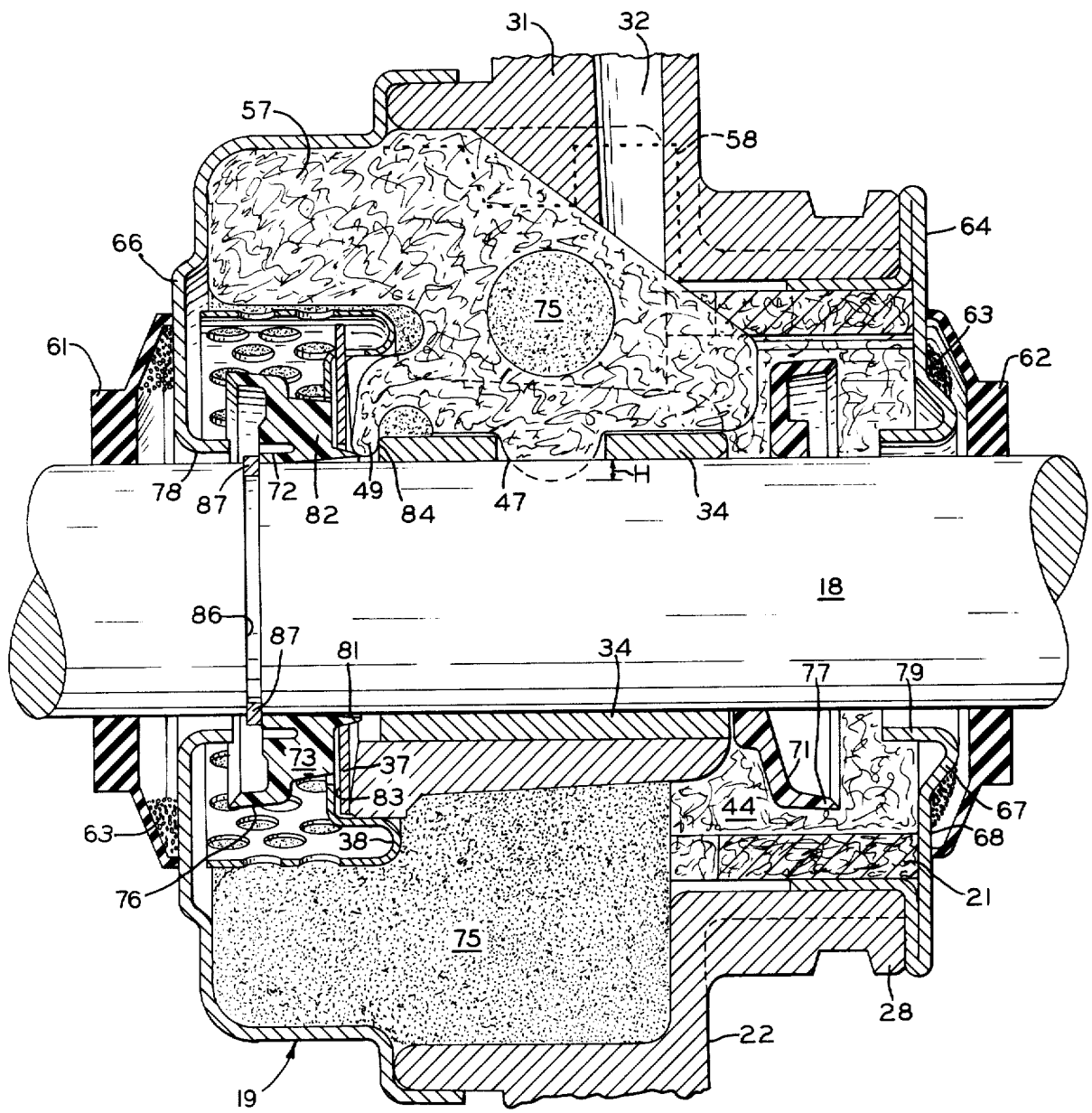
FIG. 4 is an enlarged cross-sectional view that is identical in all respects to FIG. 3 except that an extrudable or flowable lubricant retaining material has been shown in lieu of a lubricant retaining felt member.

With reference now to FIG. 3, and continuing the discussion of feed wick 42, it will be appreciated that, as the projection 47 is raised by the shaft to the assembled position shown in FIG. 3, the 51 will become smaller across its diameter in line with this movement. This "closing in " can be of particular benefit when the lubricant storage members 43 are eliminated and extrudable or flowable lubricant sources 75 (see FIG. 4) are used instead. For example, when materials such as those described in the Ridgway U.S. Pat. No. 3,184,272, dated May 18, 1965, or Abel U.S. Pat. No. 3,434,765, dated Mar. 25, 1969 are used, the feed wick will increase its grip or contact on such material within the hole and provide greater reliability of contact and oil feeding from the lubricant storage material to the feed wick 42. Still another benefit, associated with an arrangement of the type just described is that the surfaces of wick 42 which define hole 51 include cut ends of fibers in the wick 42. This general result follows since the fibers in the wick are generally oriented in parallel or slightly skewed relation with the flat faces 56, 57 of the wick 42. FIG. 4 clearly illustrates flowable lubricant retaining material 75 and the relationship thereof to feed wick 42; but in all other respects, FIG. 4 is identical to FIG. 3.

The surfaces around hole 51 (or another cut-out in wick 42) are thus, in effect, cross-grained and this is believed to be particularly effective in contributing to increased lubricant transmission rates to wick 42 from materials such as those mentioned in the above referenced Abel and Ridgway patents or from other, materially different materials (e.g., those taught in Staak U.S. Pat. No. 2,960,371).

For some applications and designs of lubricant reservoirs, the upper portion of feed wick 42 may be contoured as represented by phantom line 58. In this event, it may be preferable to utilize an open-sided cut-out as represented at 59 rather than a hole. When this done, cross-grained wick surfaces still are formed that will compress a lubricant source after assembly and that will provide desirable lubricant (e.g., oil) transfer characteristics from extrudable lubricant retaining materials. Moreover, as in the case of cut-out or hole 51, contact forces of tab 47 on the shaft will be reduced and deflection of tab 47 will be more easily accomplished. This in turn will also increase the ease of insertion of the wick and make manual or machine assembly of the wick easier and less troublesome. The modification just described (and approximately indicated by line 58) also facilitates assembly because it makes it easier to bend the wick during assembly. The wick 42 is also preferably contoured as shown at 40 and 45 so that tab 49 may be radially deflected without high contact pressures from the thrust runner.

With reference now to FIGS. 3 and 1, it will be noted that the system 19 includes inner (or inboard) and outer (outboard) rubbing seals 61, 62 that are effective for keeping contaminants, (e.g., dust and water) out of the lubricant reservoir of the system. These seals 61, 62 are substantially identical and engage the shaft 18 sufficiently tightly to rotate therewith. Seals 61, 62 may be formed of Neoprene, Urethane, or other suitable materials, the primary selection criteria being satisfactory wear characteristics and resistance to deterioration from lubricating oils. Seals 61, 62 also operate as water slingers when motor 10 is operated with the shaft horizontal or vertical and any water that might be present on the seals will be thrown radially outwardly from the seals during motor operation. In order to prolong the life of seals 61 or 62, lubricant, preferably in the form of grease 63, may be placed between the seal and the face of end cap 64 or lubricant reservoir 66 so than an oil film will exist at the rubbing interface of the rubbing parts. The amount and kind of grease is selected to provide a low rate of oil feed so as to obtain maximized seal life as dictated by the needs of the seal.

It is also desirable (to inhibit water entry) for end cap 64 or cover 66 to have a raised portion or barrier as shown, e.g., at 67. This portion is centrally disposed relative to the shaft and is offset axially outwardly along shaft 18 relative to adjacent region 68 of the end cap 64 and cover 66. Cover 66 may, as will be understood, be shaped or contoured similar to end cap 64.

When shaft 18 rotates in bearing 34, oil is fed from the lubricant reservoir to feed wick 42 and thence through window 48 to the bearing journals. Oil then will be moved axially toward each end of the bearing and, as will be understood by persons skilled in the art, this oil then should be thrown or slung back into the lubricant reservoir. For horizontal shaft operation, oil will move along the shaft 18 to oil thrower or slinger 71, 72, and thence to the oil reservoir with substantially no problem. In fact, when shaft 18 is horizontal and stopped, oil would tend to drip, due to forces of gravity, from these slingers directly into the reservoirs.

For vertical shaft operation well-known conventional slinger or thrower arrangements would be reliable for high shaft speeds, such as 1800 rpm or higher. The slinger 71 and slinger portion 72 of thrust runner 73, however, at very low shaft speeds and stand still, oil will be either thrown or dripped to the lubricant reservoir of system 19 from the oil divesting portions 76, 77 of slingers 72, 71 even for non-horizontal, e.g., vertical shaft motor applications. With the illustrated arrangement, the oil draining lip diameter of each slinger is greater (i.e. the lips are located a greater radial distance from the rotational axis or longitudinal centerline of shaft 18) than the diameter of the inner lips 78, 79 of the end caps 66, 64 at each end of the bearing enclosing housing determined by the end caps 66, 64.

The bearing and lubrication system 19 will have good oil retention characteristics (i.e., low oil loss outwardly along the shaft 18) regardless of shaft speed or shaft orientation. Thus, there would not be a lower limiting vertical shaft speed at and below which oil would fail to be returned to the reservoir.

With continued reference to FIG. 3, the thrust feed wick portion 49 of wick 42 is in predominantly radial contact with the lip 81 of thrust runner 73. With this arrangement, axial movement of lip 81 to the right as viewed in FIG. 3 will cause the lip 81 to wedge itself under the wick portion 49. Of course, thrust loads causing such movement wil cause the rotating thrust runner surface 82 to move toward and against the stationary surface 83. In this manner, compression of thrust feeder portion 49 between the thrust runner and end face 84 of the bearing 34 may be substantially reduced or eliminated. This arrangement is in contrast to those wherein positive contact between a thrust feed wick and runner, for positive oil feed, is established and maintained through a predominantly axial contact resulting from axial rather than radial relationships between the feed wick and runner. The illustrated arrangement is desirable, as will be understood, because it assures avoidance of undue compression of the feed wick which could increase the local density of the feed wick whereby its oil feed rate would be reduced to objectionably low levels and whereby it could be more readily clogged with foreign particles. Excessive contact pressures could also cause the lip 81 to wear, the contact surface of the feed wick to become glazed, and tightly packed and clogged with wear particles. Although this process of degradation of the oil feeding member 49 may take appreciable time, it can lead to failure of the oil feed system before the lubricant reservoir has lost its oil supply and thus cause a premature thrust feed lubricant failure. All of this may now be avoided, since axial movement of lip 81 causes an easily absorbed radial movement of wick portion 49 that results in a readily tolerated wick deformation rather than excessive axial compression of the wick.

The oil throwers 71 and thrust runners 72 at each end of motor 10 are, preferably, press fitted onto shaft 18. However, extra assurance against undesired movement of the runners 72 on the shaft is provided by means of split-ring retainers 87 that are carried in groove 86. In order to ease assembly of the parts, the bore of runner 72 is tapered and only portion 70 contacts the shaft. In addition, portion 70 is fomed as a lip or thin section, yieldable during assembly as the shaft with ring 87 thereon, is inserted into the bearing system 19.

The foregoing detailed description has been directed primarily to system 19, but it will be understood that the same parts and arrangements thereof are also provided for system 21 (it being noted that an outboard rubbing seal is omitted since the shaft 18 does not extend through end cap 31).

From the foregoing description, it will be apparent that new and improved bearing lubrication and lubricant retention systems in dynamoelectric machines may be provided utilizing one or more of the unique features or arrangements taught hereinabove. It will be particularly noted that various aspects of the exemplification may be readily incorporated in existing systems while requiring substantially no additional change in such system.

For example, rubbing seals may be provided as the sole improvement; or advantage may be taken of feed wicks having a desired cross-grain feeding surface, a desired reduced stiffness for reduced contact pressures, a desired post assembly lubricant "gripping" action, or a desired thrust feeder having a predominantly radial contact. Moreover, whereas wick member 42 has been described as being made of felt, other materials (whether synthetic or naturally occurring, or combinations thereof) may be used; the primary selection criteria being that such material exhibit the desired lubricant transferring or feeding characteristics.

with reference again to FIG. 2, it will be noted that a tab or projection 97 is provided on retainer 38. This tab permits thrust member 37 to be snapped into assembled and centered relationship with retainer 38. When member 37 is assembled with retainer 38, tab 97 will yield and then snap or spring back to trap and retain member 37 until the assembled thrust member and retainer are held in place on hub flange 41. Then, tab 97 will yield as the retainer 38 is pressed onto the hub.

While the invention has been explained by describing a particular embodiment thereof, it will be apparent that changes may be made in the structure disclosed without departing from the invention. It is, therefore, intended in the following claims to cover all such equivalent variations that fall within the scope of my invention.

What I claim as new and desire to secure by Letters Patent of the United States is:

1. A dynamoelectric machine including a shaft, a rotor mounted on the shaft for rotation therewith; bearing means including at least one sleeve type bearing rotatably supporting the shaft; and a lubrication system for the bearing means including a lubricant reservoir with lubricant retaining material disposed therein; said bearing having a lubricant admitting passage for permitting a flow of lubricant from the lubricant reservoir to a bearing surface of the bearing; and a feed wick for transferring lubricant from the lubricant reservoir to said bearing surface; said feed wick including a projection in the lubricant admitting passage of said bearing and in engagement with the shaft, said feed wick being compressively retained between the shaft and a wall portion of the lubricant reservoir to prevent inadvertent displacement of said projection from engaging relation with the shaft; the material forming said feed wick defining at least one cut out region along a line extending in generally normal relation to the shaft and through said projection, whereby excessive contact pressures between the shaft and projection are prevented.

2. The dynamoelectric machine of claim 1 wherein a thrust transmitting member is carried by the shaft and movable into engagement with a stationary thrust bearing surface, said thrust transmitting member including a lip extending axially along said shaft; and wick means for transferring lubricant to said lip, said wick including a thrust wick disposed to establish predominantly radial contact with the lip of the thrust transmitting member whereby axial movement of the thrust transmitting member toward the stationary thrust surface will cause radial movement of a lubricant feeding surface portion of the thrust wick away from the shaft.

3. The dynamoelectric machine of claim 1 wherein a lubricant retaining mass is contained in the lubricant reservoir; said lubricant retaining mass comprises a flowable and extrudable lubricant retaining material; said feed wick is a fibrous material, said cut out region of the wick is established by at least one cross-grained surface; and the extrudable material is in contact with said at least one cross-grained surface thereby to enhance the lubricant transfer rate from the lubricant retaining material to the feed wick.

4. The dynamoelectric machine of claim 3 wherein the contact pressure between the wick projection and shaft is transmitted through the feed wick to cause at least slight compression of the extrudable lubricant retaining material disposed within the cut out portion of the feed wick.

5. The dynamoelectric machine of claim 3 wherein at least one rubbing seal is provided along an exterior of the lubricant reservoir thereby to retard the movement of contaminants into the lubricant reservoir.

6. A dynamoelectric machine having a rotor assembly including a shaft rotatable about an axis of revolution; bearing means rotatably supporting the shaft including at least one sleeve bearing with a lubricant admitting passage therein; a lubricant reservoir for retaining lubricant to be supplied to the sleeve bearing; and means for transferring lubricant from the lubricant reservoir along the lubricant admitting passage to a bearing surface; said means for transferring comprising a feed wick compressively retained in the lubricant reservoir and having a projecting portion extending into the passage of the bearing and having at least a portion thereof contacting the shaft; said feed wick having a cut out portion spaced from said projecting portion and positioned, relative to the lubricant admitting passage and feed wick projecting portion so that it is at least approximately located along a line passing through the surface of the shaft, the axis of revolution of the shaft, and the shaft contacting portion of the projecting portion so that the feed wick projecting portion engages the surface of the shaft with a relatively reduced contact pressure.

7. The dynamoelectric machine of claim 6 further including a mass of a flowable and extrudable lubricant retaining material; the cut out portion of the feed wick being established by at least one cross-grained wick surface; and the extrudable material being in contact with said cross-grained surface and pressed thereagainst thereby to enhance the rate of lubricant transfer from the lubricant retaining material to said wick member.

8. The dynamoelectric machine of claim 7 further including a lubricating system for the sleeve bearing comprising a lubricant retaining material and a perforated retainer, said perforated retainer permitting lubricant circulation from the sleeve bearing to the lubricant retaining material and constraining particles of the lubricant retaining material from radial movement toward the shaft.

9. An electric motor comprising a rotor assembly including a shaft; a stator assembly; a bearing system at one end of the stator assembly including a bearing rotatably supporting the shaft; said bearing system including a lubricant retaining reservoir having spaced apart first and second end wall defining members; a first seal supported for rotation with the shaft in rubbing engagement with the exterior of the first end wall defining member; a second seal supported for rotation with the shaft in rubbing engagement with the exterior of the second end wall defining member; at least one of the seals and its associated end wall defining member establishing a cavity therebetween; and a quantity of lubricant disposed in the cavity for lubricating the rubbing interface of the at least one seal and its associated end wall defining member.

10. The electric motor of claim 9 wherein at least said associated end wall defining member is provided with a circumferentially extending barrier portion and said at least one of the seals may sling water radially away from the shaft and exteriorly of the associated end wall defining member.

11. The electric motor of claim 9 wherein a lubricant retaining material is disposed within the lubricant retaining reservoir and a perforated member is disposed interiorly of the first and second end wall defining members, said perforated member permitting a flow of lubricant from the vicinity of the shaft to the lubricant retaining material and inhibiting movement of the lubricant retaining material radially toward the shaft.

12. A dynamoelectric machine comprising a stator assembly; a rotor assembly; at least one bearing system having a bearing supporting the rotor assembly for rotation relative to the stator assembly; flowable and extrudable lubricant retaining material disposed adjacent to the bearing of the at least one bearing system; a member for feeding lubricant to the shaft from the lubricant retaining material and means for mechanically retaining the flowable and extrudable lubricant retaining material in predetermined spatial relation with the shaft, and for permitting movement of lubricant to the flowable and extrudable lubricant retaining material from the vicinity of the shaft; said means for mechanically retaining comprising a retainer having a plurality of perforations therein that establish lubricant transmitting passages with the perforations being defined by webs of material spaced radially from and extending axially along the shaft which restrain the flowable and extrudable lubricant retaining material from moving into engagement with the shaft, while permitting the flow of lubricant therepast; said bearing of the at least one bearing system being a sleeve bearing with a lubricant feeding aperture therein; said dynamoelectric machine further including a feed wick having a projection disposed in the aperture of the bearing, with the feed wick being a flat piece of felted material and the feed wick including at least one cross-grained surface that at least in part establishes a passage for movement of the extrudable material from one flat side of the feed wick to another flat side of the feed wick.

* * * * *